P. GANZHORN & W. C. MUELLER.
ATTACHMENT FOR WEIGHING SCALES.
APPLICATION FILED JAN. 26, 1903. RENEWED DEC. 27, 1904.
1,011,609.
Patented Dec. 12, 1911.
2 SHEETS—SHEET 1.
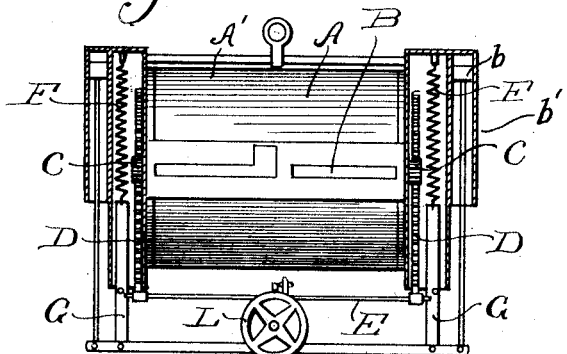
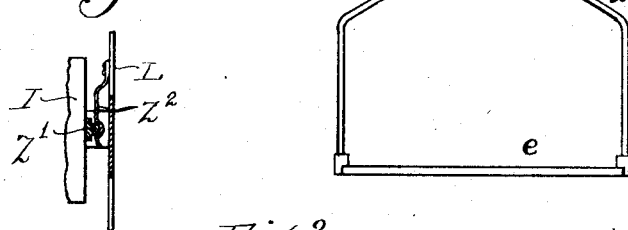
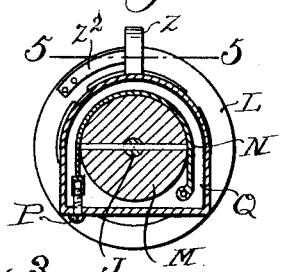
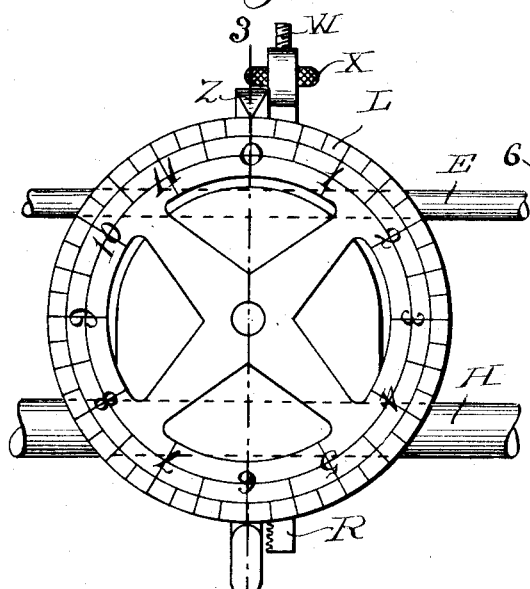
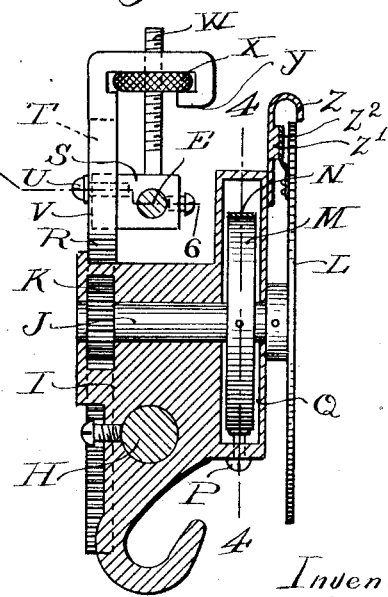
Witnesses:
E. F. Wilson
Erwin J. Loth
Inventors:
Philip Ganzhorn
William C. Mueller
By Rudolph W. Lotz
Attorney P. GANZHORN & W. C. MUELLER.
ATTACHMENT FOR WEIGHING SCALES.
APPLICATION FILED JAN. 26, 1903. RENEWED DEC. 27, 1904.
1,011,609.
Patented Dec. 12, 1911.
2 SHEETS—SHEET 2.
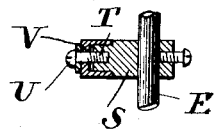
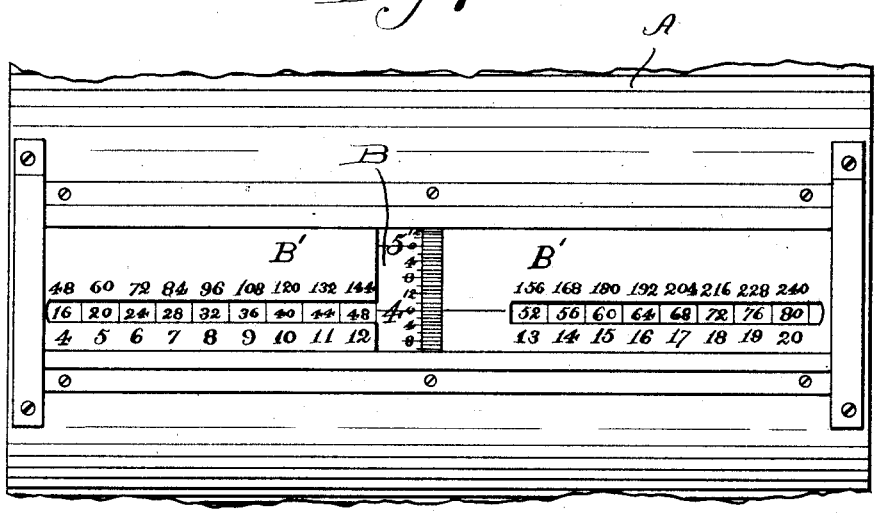
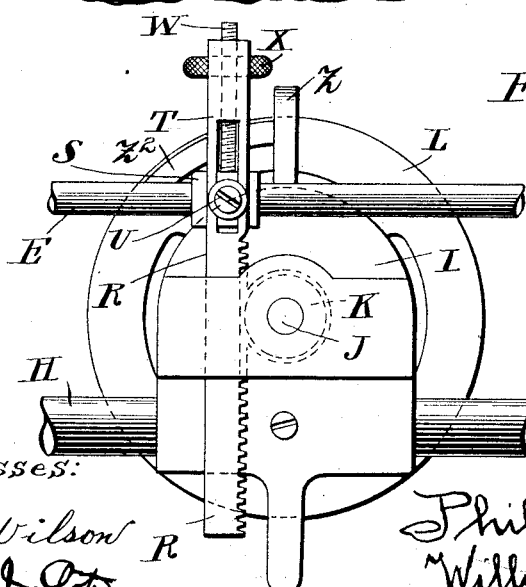

UNITED STATES PATENT OFFICE.

PHILIP GANZHORN AND WILLIAM C. MUELLER, OF CHICAGO, ILLINOIS, ASSIGNORS TO TOLEDO COMPUTING SCALE COMPANY, OF TOLEDO, OHIO, A CORPORATION OF NEW JERSEY.

ATTACHMENT FOR WEIGHING-SCALES.

1,011,609. Specification of Letters Patent. Patented Dec. 12, 1911.

Application filed January 26, 1903, Serial No. 140,625. Renewed December 27, 1904. Serial No. 238,426.

*To all whom it may concern:*

Be it known that we, PHILIP GANZHORN and WILLIAM C. MUELLER, citizens of the United States, residing at Chicago, in the county of Cook and State of Illinois, have invented certain new and useful Improvements in Attachments for Weighing-Scales; and we do hereby declare the following to be a full, clear, and exact description of the invention, such as will enable others skilled in the art to which it appertains to make and use the same.

Our invention relates to a novel construction in an attachment to weighing scales, the object being to provide a device by means of which the scale can be readily adjusted to deduct dead-weight, or in other words, after placing a dead-weight on the scale to set same back to 0, so that only the merchandise subsequently placed thereon is weighed, and, by means of which the capacity of the scale is increased, and consists in the features of construction and combinations of parts hereinafter fully described and claimed.

In the accompanying drawings illustrating our invention: Figure 1 is a front elevation, partly in section, of a scale provided with an attachment constructed in accordance with our invention. Fig. 2 is a front elevation of our attachment. Fig. 3 is a central vertical section of same on the line 3—3 of Fig. 2. Fig. 4 is a detail section on a reduced scale, on the line 4—4 of Fig. 3. Fig. 5 is a detail section on the line 5—5 of Fig. 4. Fig. 6 is a fragmentary detail section on the line 6—6 of Fig. 3. Fig. 7 is a fragmentary front elevation of the scale dial showing the method of computing the cost of the merchandise. Fig. 8 is a rear elevation of our attachment, showing fragmentary parts of the scale.

The same letters of reference are employed to indicate corresponding parts in the several views.

As shown in Fig. 1, A A' represent the frame and cylindrical casing of a familiar form of computing scale, within which is rotatably mounted the usual drum B. The projecting journals or trunnions of the drum B have fast upon them pinions C C which mesh with vertically movable rack bars D D connected together at their lower ends by a cross rod E.

Coiled springs F F hung at their upper ends within the frame A have their lower ends connected with vertical rods or bars G G, whose lower ends are secured to the rod or bar H (commonly known as the spring-bar), located beneath and parallel with the cross rod E. Rods $a\ a$ secured at their lower ends to the outer ends of the spring-bar H carry at their upper ends small pistons $b$ working in vertical cylinders $b'$ formed for them in the frame A, and serving to cushion the return upward movement of the parts by the springs F F. The rod E and spring-bar H are connected together so as to normally move in unison with each other, but are adjustable relatively to each other in the manner and for the purpose hereinafter described.

Secured upon the spring-bar H at its middle is a casting I having a depending hook $c$ to receive the bail $d$ of the scale pan or platform $e$, Figs. 1 and 3. Journaled in this casting I and extending centrally through the same from front to rear is a shaft J upon the rear end of which is secured a pinion K, Figs. 3 and 8, which meshes with a rack-bar R guided vertically in ways in the casting I. The rack-bar R is connected at its upper end (in the manner hereinafter described) with the cross rod E which connects the lower ends of the vertical rack-bars D D, Fig. 1, so that by turning the shaft J and pinion K in one direction or the other the cross rod E and its connected rack-bars D D may be raised or lowered relatively to the spring-bar H at will.

Secured upon the extreme forward end of the shaft J is a graduated hand wheel or dial L (Figs. 2 and 3), by means of which the shaft J may be turned to effect the movement of the cross rod E and spring-bar H relatively to each other as just described. A fixed index finger or pointer Z coöperates with the dial L, while a spring $Z^2$ secured upon the rear side of the dial coöperates with a lug Z' upon the pointer, Figs. 3 and 5, to arrest the dial at, and yieldingly hold it in, normal or zero position, Fig. 2.

Secured upon the shaft J in rear of the dial L, within a casing Q formed in or upon the casting I to receive it, is a friction disk M upon which bears a brake-strap N, Figs. 3 and 4, the tension of the strap and the consequent friction between it and the disk being adjustable by means of a screw P to which the free end of the strap is connected. This friction device serves to yieldingly but securely hold the dial L and shaft J and connected parts in any position to which they may be moved.

The upper end of the rack-bar R is provided with a forwardly extending arm Y, Fig. 3, having a recess within which fits a thumb-nut X threaded upon a vertical rod W which is secured at its lower end in a block S fast upon the cross rod E. By turning the nut X in one direction or the other the cross rod E may be adjusted upward or downward relatively to the spring-bar H, independently of the adjustment of the other parts by means of the dial L, shaft J and pinion K heretofore described. The rear end of the block S fits in a vertical recess T in the rack-bar R, while a screw U is passed through a vertical slot in the rear side of said bar and enters the block S. When the parts have been adjusted by means of the thumb-nut X they may be locked in adjusted position by tightening up the screw U.

The adjusting devices last described (*i. e.*, those operated by the thumb nut X), are similar to those commonly provided in spring scales of this character for adjusting the cross rod E and rack-bars D D vertically relatively to the spring-bar H, for the purpose of initially setting the drum B at zero. This adjustment is provided for the purpose of compensating for any variation in the springs F F or other parts, and is made at the time the scale is originally set up for use, and from time to time thereafter as occasion may require. As compared with the rapid and wide adjustments of the parts relatively to each other by means of the dial L and its connected parts, as hereinafter described, it may be considered a permanent adjustment, and it forms, *per se*, no part of our invention.

Referring now to the novel means which we have provided for rapidly effecting wide adjustments of the cross rod E and rack bars D D relatively to the spring bar H, the operation of this part of our invention is as follows: It will be understood that when a weight is placed upon the scale pan *e* it will pull the latter and the spring bar H downward until its gravity is counterbalanced by the tension of the springs F F; and that inasmuch as the cross rod E connecting the lower ends of the rack bars D D is so connected with the spring-bar H as to move downward with it, the downward movement of the rack-bars D D will rotate the computing drum B from zero to a point corresponding to the gravity of the weight. It will be further understood that, with the parts moved to such position by a weight placed upon the scale pan, the computing drum B may be quickly turned back to zero or initial position (without affecting the spring-bar H or the parts connected to or suspended from it) by turning the dial L, Fig. 2, from right to left, or anti-clockwise, and thereby lifting the rack-bars D, D and consequently moving the cross rod E upward relatively to the casting I and spring-bar H. In the practical use of the scale the means thus provided for quickly returning the computing drum to zero independently of the spring-bar and connected parts is employed as follows in taking out the "tare" or deducting the weight of any receptacle placed upon the scale preparatory to receiving the commodity to be weighed in it. Thus, if a customer desires to purchase two pounds of lard and brings a dish to receive it, the empty dish is placed upon the scale platform, which will cause the computing drum to be turned until it exhibits the weight number 2 and corresponding value numbers at the sight openings in the casing A'. By then turning the dial L from right to left, the clerk lifts the cross rod E and rack-bars D D and returns the computing drum to zero, after which the quantity of lard desired is placed in the dish and its weight and value indicated upon the computing drum, at the sight opening in the casing, in the usual manner.

The foregoing operation of deducting the tare may of course be carried out by the means which we have provided even if the dial L be not graduated and no index or pointer be provided to coöperate with it; but the operation is greatly facilitated by providing the graduated dial and coöperating pointer, and so constructing and adjusting the parts that the graduations and movements of the dial will correspond with the graduations and movements of the computing drum, a complete revolution of the dial causing a complete revolution of the drum. In the present instance the computing drum may be assumed to have a capacity of twelve pounds, and the dial L is accordingly shown divided into twelve equal divisions representing pounds, and numbered from zero to eleven, with fractional divisions in each representing half pounds and quarter pounds. With this provision, whenever a weight whose tare is to be deducted is placed upon the scale platform the clerk has simply to note the weight indicated upon the computing drum at the sight opening in the scale casing, and then turn the dial L to the left until the graduation representing the corresponding weight is brought opposite the pointer Z. Such movement of the dial L will serve to restore the computing drum to exactly zero position, and will relieve the operator of the necessity of exercising the care and taking the time which would be required to return the drum to that position if he were obliged to rely upon inspection of the drum at the sight opening in the casing to determine when it had reached such position.

As will be understood from the foregoing description, when it is desired to take out the tare of any article or receptacle, it is simply necessary to place it upon the scale platform, note its weight, then turn the dial L until the corresponding graduation registers with the pointer.

A further purpose of the means we have provided for returning the rack bars and computing drum to initial position is to increase the normal capacity of the scale, and its operation in this respect is as follows: Assuming that the normal capacity of the computing drum is twelve pounds, as heretofore suggested, and it is desired to weigh and compute the value of a piece of meat weighing approximately sixteen pounds. If the meat were placed upon the scale platform it would pull the latter and its connected parts downward until the computing drum had made one complete revolution and been arrested by the usual stops provided for the purpose, and in the absence of the means we have provided it would not be possible to weigh or compute the value of the meat. With such provision, however, its weight and value may be indicated and computed as follows: The meat is placed upon the scale platform, and the latter consequently depressed until the computing drum is given a complete revolution and arrested, indicating the weight and value of twelve pounds. The clerk then gives the dial L a complete revolution from right to left, which will have the effect of separating the cross rod E and spring bar H a maximum distance from each other, in the manner heretofore explained. The first effect of the movement of the dial and separation of the bars will be simply to permit the weight upon the scale platform to pull the spring bar downward (the cross rod E, rack bars D D and drum B remaining stationary) until the increasing tension of the springs F F counterbalances the weight upon the platform. This, in the case supposed, will occur when the graduated dial has been turned until its number 4 has been brought opposite the pointer Z, since the excess of weight of the article being weighed over that indicated by a complete revolution of the computing drum is four pounds. From this point onward, however, the weight upon the platform having been counterbalanced by the increased tension of the springs, the spring-bar H and parts connected with it (including the suspended scale platform) will remain stationary, so that during the remaining two-thirds of the complete revolution of the dial L the drum B will be carried backward (toward zero or initial position) through two-thirds of a revolution, and thereby caused to exhibit the weight number 4 and the corresponding price totals at the sight openings in the casing, as shown in Fig. 7. As there shown, the casing of the scale is provided adjacent the sight openings with scale plates B' B' having horizontal slots through which a single row of horizontal value numbers upon the computing drum may appear. Below the slots are a series of numbers indicating prices per pound, while above the slots are a series of numbers indicating the maximum values computable upon the scale at the respective prices per pound, in the present instance the maximum values being twelve times the respective prices per pound inasmuch as the normal maximum weighing capacity of the scale is twelve pounds, as before explained. When, therefore, an article weighing more than the normal capacity of the scale has been weighed in the manner described it is simply necessary, in order to ascertain its weight, to add the weight number appearing at the sight opening to the normal weighing capacity of the scale,—four, in the example explained, being added to twelve, to arrive at the assumed weight of sixteen pounds. Likewise, in order to arrive at the value of the article weighed, it is simply necessary to add to the value number appearing above the sight opening in the casing (opposite the particular price per pound) the amount appearing upon the computing drum immediately beneath such value number. Thus, in the example suggested, if the price of the meat were fifteen cents per pound it would simply be necessary to add the sixty cents appearing upon the computing drum immediately above the number 15 to the $1.80 appearing on the scale plate immediately above the number 60, as shown in Fig. 7, thereby reaching the total value, $2.40, of the sixteen pounds of meat at fifteen cents per pound.

Another method of utilizing the means which we have provided, for increasing the weighing and computing capacity of the scale, is (in the operation above described) to turn the dial L to the left only five-sixths of a revolution, or until its number 10 is brought opposite the pointer Z. The result of this will be that after the weight upon the platform has been counterbalanced by the increased tension of the springs (when the number 4 upon the dial reaches the pointer), the further movement of the dial until its number 10 is brought opposite the pointer will turn the computing drum backward one-half of a revolution and cause its weight number 6 and corresponding value numbers to be exhibited at the sight openings in the casing. The value of ten pounds at any given rate per pound may of course be computed mentally, so that it is only necessary for the clerk to add to such amount the value of the excess over ten pounds indicated by the computing drum at the sight opening. Thus, in the assumed case of the sixteen pound piece of meat at fifteen cents per pound, the value of ten pounds would be $1.50 and the value of the excess of six pounds would be indicated by the number 90 which would appear at the sight opening, where the number 60 is shown in Fig. 7.

We are aware that it is old to construct computing scales of this general character in which the length and range of movement of the rack bars which operate the computing drum were made such that the drum might be given more than a complete revolution when it was necessary to weigh articles exceeding the normal capacity of the scale, but in such case the scale has to be constructed to accommodate the increased length and range of movement of the rack bars. By means of our invention, on the other hand, we can at any time double the normal capacity of the scale without having provided for any excessive length of either the rack bars or their range of movement.

While the scales here shown are adapted for a normal capacity of twelve pounds it is of course to be understood that the particular manner of sub-dividing graduated parts such as the drum and the dial is not essential and may be varied to suit different requirements as to weight capacity.

We claim as our invention:

1. In a spring scale, the combination, with a computing drum, rack bars for operating the same, a spring-bar and its supporting springs, and connections between the rack bars and spring bar including means for relatively adjusting the rack bars and spring-bar to secure normal zero position of the drum, and a hand-wheel, and means operated thereby for quickly relatively adjusting them to return the drum to or toward zero position when the scale is loaded.

2. In a spring scale, the combination, with a computing drum, rack bars for operating the same, a spring-bar and its supporting springs, and means for relatively adjusting the rack bars and spring-bar to secure normal zero position of the drum, and a graduated hand-wheel and index or pointer, and means operated thereby for quickly relatively adjusting them to return the drum to or toward zero position when the scale is loaded.

3. In a spring scale, the combination, with a computing drum, rack bars for operating the same, a spring-bar and its supporting springs, and means for relatively adjusting the rack bars and spring-bar to secure normal zero position of the drum, and a hand-wheel, and means operated thereby for quickly lifting the rack bars relatively to the spring bar to return the drum to or toward zero position when the scale is loaded.

4. In a spring scale having means for adjusting the computing drum to zero when the scale is not loaded, the combination, with said drum, the rack bars for operating the same and the spring bar and its supporting springs connected with the rack bars, of means for quickly lifting the rack bars independently of the spring-bar and independently of the first-mentioned zero adjusting means, to return the computing drum to or toward zero position, when the scale is loaded, without affecting the zero adjustment first mentioned.

5. In a spring scale, the combination, with the computing drum, the rack bars for operating the same, and the spring-bar and its supporting springs connected with the rack bars, and means for relatively adjusting the rack bar and spring bar to secure normal zero position of the drum, of a graduated hand wheel and index or pointer, and means operated thereby for quickly lifting the rack bars, to return the drum toward zero position, when the scale is loaded.

6. In a spring scale, the combination, with the computing drum, the rack bars for operating the same, the cross rod connecting the lower ends of the rack bars, and the spring-bar and its supporting springs connected with the cross rod with provisions for adjustment to secure a zero position of the drum when the scale is not loaded, of means for quickly separating the cross rod and spring-bar independently of said provisions for zero adjustment to return the drum toward zero position, when the scale is loaded.

7. In spring scales, the combination of load-supporting means, directly connected with the springs, an indicator, operating means therefor and means connecting the latter means and the load-supporting means including toothed gearing whereby the relative adjustment between them can be varied through a relatively wide range when the scales are loaded; substantially as described.

8. In spring scales, the combination of load-supporting means, directly connected with the springs, an indicator, operating means therefor and means connecting the latter means and the load-supporting means including a rack and pinion whereby the relative adjustment between them can be varied through a relatively wide range when the scales are loaded; substantially as described.

9. In a spring scale, the combination, with the computing drum, the rack bars for operating the same, the cross rod connecting the lower ends of the rack bars, and the spring-bar and its supporting springs, of a rackand-pinion connection between the cross rod and spring-bar, and means for turning the pinion to quickly adjust the rod and bar relatively to each other.

10. In a spring scale, the combination, with the computing drum, the rack bars for operating the same, the cross rod connecting the lower ends of the rack bars, and the spring-bar and its supporting springs, of a rack-and-pinion connection between the cross rod and spring-bar, means for turning the pinion to quickly adjust the rod and bar relatively to each other, and a friction device for holding them in their adjusted positions.

11. In a spring scale, the combination, with the computing drum, the rack bars for operating the same, the cross rod connecting the lower ends of the rack bars, and the spring-bar and its supporting springs, of a rack-and-pinion connection between the cross rod and spring-bar, a shaft for turning the pinion to quickly adjust the rod and bar relatively to each other, a friction disk fast upon said shaft, and a brake applied to said disk.

12. In a spring scale, the combination, with the computing drum, the rack bars for operating the same, the cross rod connecting the lower ends of the rack bars, and the spring-bar and its supporting springs, of a rack-and-pinion connection between the cross rod and spring-bar, a shaft for turning the pinion to quickly adjust the rod and bar relatively to each other, and a graduated hand wheel for turning the shaft.

13. In a spring scale, the combination, with the computing drum, the rack bars for operating the same, the cross rod connecting the lower ends of the rack bars, and the spring-bar and its supporting springs, of a rack-and-pinion connection between the cross rod and spring bar, a shaft for turning the pinion to quickly adjust the rod and bar relatively to each other, a friction disk fast upon the shaft, a brake applied to said disk, and a graduated hand wheel also fast upon the shaft for turning it to different indicated positions.

14. In a spring scale, the combination, with the computing drum, the rack bars for operating the same, the cross rod connecting the lower ends of the rack bars, and the spring bar and its supporting springs, of a rack interposed between the rod and bar and having an adjustable but normally fixed connection with one of them, a pinion carried by the other and meshing with the rack, and means for turning the pinion to quickly adjust the rod and bar relatively to each other.

15. In a spring scale, the combination, with the computing drum, the rack bars for operating the same, the cross rod connecting the lower ends of the rack bars, and the spring-bar and its supporting springs, of a rack interposed between the rod and bar and having an adjustable but normally fixed connection with the rod, a pinion carried by the spring-bar and meshing with the rack, and means for turning the pinion to quickly adjust the rod and bar relatively to each other.

16. In a spring scale, the combination, with the computing drum, the rack bars for operating the same, the cross rod connecting the lower ends of the rack bars, and the spring-bar and its supporting springs, of a casting secured to the spring-bar, a rack bar guided vertically in said casting and having its upper end connected with the cross rod, a shaft journaled in the casting and carrying a pinion meshing with the rack, and means for turning the shaft to quickly adjust the rod and bar relatively to each other.

17. In a spring scale, the combination, with the computing drum, the rack bars for operating the same, the cross rod connecting the lower ends of the rack bars, and the spring-bar and its supporting springs, of a casting secured to the spring-bar, a rack bar guided vertically in said casting and having its upper end connected with the cross rod, a shaft journaled in the casting and carrying a pinion meshing with the rack, a friction disk fast upon the shaft, and a brake applied to said disk.

18. In a spring scale, the combination, with the computing drum, the rack bars for operating the same, the cross rod connecting the lower ends of the rack bars, and the spring-bar and its supporting springs, of a casting secured to the spring bar, a rack bar guided vertically in said casting and having its upper end connected with the cross rod, a shaft journaled in the casting and carrying a pinion meshing with the rack, and a graduated hand wheel for turning said shaft to different indicated positions.

19. In a spring scale, the combination, with the computing drum, the rack bars for operating the same, the cross rod connecting the lower ends of the rack bars, and the spring-bar and its supporting springs, of a casting secured to the spring bar, a rack bar guided vertically in said casting and having its upper end connected with the cross-rod, a shaft journaled in the casting and carrying a pinion meshing with the rack, a friction disk fast upon said shaft, a brake applied to the disk, and a graduated hand wheel also fast upon the shaft for turning the latter to different indicated positions.

20. In a spring scale of the character described, the combination, with the cross rod E and spring bar H, of the casting I, fast upon the spring bar H, the vertical rack bar R guided in the casting I, the screw rod W secured to the cross rod E, the thumb nut X located upon said rod and confined in a recess in the upper end of the rack bar R, the shaft J journaled in the casting I, the pinion K fast upon said shaft and meshing with the rack bar R, and means for turning the shaft.

21. In a spring scale of the character described, the combination, with the cross rod E and spring bar H, of the casting I, fast upon the spring bar H, the vertical rack bar R guided in the casting I, the block S fast upon the cross rod E and engaging the rack bar R, the screw rod W projecting from the block S, the thumb nut X located upon said rod and confined in a recess in the upper end of the rack bar R, the screw U for locking the block S to the rack bar R, the shaft J journaled in the casting I, the pinion K fast upon said shaft and meshing with the rack bar R, and means for turning the shaft.

22. In a spring scale having means for adjusting the weight indicating devices to zero when the scale is not loaded, the combination, with said means and said weight indicating devices, of a graduated hand wheel rotatable in a substantially vertical plane to expose the graduations to the salesman, and means operated thereby for quickly returning the weight indicating devices to or toward zero when the scale is loaded.

23. In a spring scale having means for adjusting the weight indicating devices to zero when the scale is not loaded, the combination, with said means and said weight indicating devices, of a hand wheel, means operated thereby for quickly returning the weight indicating devices to or toward zero when the scale is loaded, and means for holding the hand wheel in its adjusted position with a yielding pressure.

24. In weighing scales, the combination of indicating means; load-supporting means; load counter-balancing means; operating connections between the indicating means and the load-supporting means, said connections comprising independent adjusting means, one for setting the indicating means at zero when no load is on the scales and the other for returning the indicating means to or toward zero when there is a load on the scales and the adjustment of one of said means not affecting the other in the matter of its adjustment but causing the same to be moved bodily; and means for indicating, in the ratio of the first-mentioned indicating means, the amount of adjustment when a load is on the scales.

25. In a spring scale, the combination with a computing drum, rack bars for operating the same, a spring bar and its supporting springs, connections between the rack bars and the spring bar including means for relatively adjusting the rack bars and spring bar to secure normal zero position of the drum, and means for quickly relatively adjusting them to return the drum to or toward zero position when the scale is loaded.

26. In a spring scale, the combination with a computing drum, rack bars for operating the same, a spring bar and its supporting springs, connections between the rack bars and spring bar including means for relatively adjusting the rack bars and spring bar to secure normal zero position of the drum, and means for quickly relatively adjusting them to return the drum to or toward zero position when the scale is loaded, and a hand-wheel for operating the latter means.

27. In a spring scale, the combination with a computing drum, rack bars for operating the same, a spring bar and its supporting springs, connections between the rack bars and spring bar including means for relatively adjusting the rack bars and spring bar to secure normal zero position of the drum, and means for quickly relatively adjusting them to return the drum to or toward zero position when the scale is loaded, including a graduated hand-wheel and index or pointer.

28. In a spring scale, the combination with a computing drum, rack bars for operating the same, a spring bar and its supporting springs, connections between the rack bars and spring bar including means for relatively adjusting them to secure normal zero position of the drum, and means for quickly lifting the rack bars relatively to the spring bar to return the drum to or toward zero position when the scale is loaded.

In testimony whereof we affix our signatures, in presence of two witnesses.

PHILIP GANZHORN.
WILLIAM C. MUELLER.

Witnesses:
RUDOLPH WM. LOTZ,
ERWIN J. LOTZ.

---

Copies of this patent may be obtained for five cents each, by addressing the "Commissioner of Patents, Washington, D. C."